United States Patent
Rapp et al.

(10) Patent No.: US 11,804,727 B2
(45) Date of Patent: Oct. 31, 2023

(54) SYSTEM AND METHOD FOR PROVIDING REDUNDANT ELECTRIC POWER

(71) Applicant: KNORR-BREMSE Systeme fuer Nutzfahrzeuge GmbH, Munich (DE)

(72) Inventors: Tamas Rapp, Budapest (HU); Benedek Pour, Budapest (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/277,429

(22) PCT Filed: Sep. 5, 2019

(86) PCT No.: PCT/EP2019/073671
§ 371 (c)(1),
(2) Date: Mar. 18, 2021

(87) PCT Pub. No.: WO2020/057989
PCT Pub. Date: Mar. 26, 2020

(65) Prior Publication Data
US 2022/0037913 A1    Feb. 3, 2022

(30) Foreign Application Priority Data
Sep. 18, 2018  (EP) .................. 18195131

(51) Int. Cl.
*B60L 1/00*   (2006.01)
*H02J 9/06*   (2006.01)
*H02J 7/00*   (2006.01)

(52) U.S. Cl.
CPC ............ *H02J 9/06* (2013.01); *B60L 1/00* (2013.01); *H02J 7/0013* (2013.01)

(58) Field of Classification Search
CPC ........ H02J 2310/42; H02J 9/06; H02J 7/0013; B60L 1/00
See application file for complete search history.

(56) References Cited

U.S. PATENT DOCUMENTS

2003/0062773 A1    4/2003   Richter et al.
2013/0264994 A1   10/2013   Schaefer
(Continued)

FOREIGN PATENT DOCUMENTS

CN    202142875 U    2/2012
CN    103180163 A    6/2013
(Continued)

OTHER PUBLICATIONS

International Search Report (PCT/ISA/210) issued in PCT Application No. PCT/EP2019/073671 dated Jan. 9, 2020 (four (4) pages).
(Continued)

*Primary Examiner* — Daniel Cavallari
(74) *Attorney, Agent, or Firm* — Crowell & Moring LLP

(57) ABSTRACT

A system for providing redundant electric power to at least one vehicle component is disclosed. The system includes at least one power management unit connectable to a vehicle power network; and one or more storage units coupled to the at least one power management unit for receiving electric power to be stored in the one or more storage units. The at least one vehicle component is connectable to at least two of the storage units to enable a redundant electric power supply.

7 Claims, 2 Drawing Sheets

(56) References Cited

U.S. PATENT DOCUMENTS

| | | | |
|---|---|---|---|
| 2014/0183939 A1 | 7/2014 | Jiang et al. | |
| 2014/0265554 A1* | 9/2014 | Yang | B60L 3/0046 307/9.1 |
| 2015/0191100 A1 | 7/2015 | Schindler | |
| 2015/0274027 A1 | 10/2015 | Crombez et al. | |
| 2017/0232851 A1* | 8/2017 | Unno | H02P 27/08 307/10.1 |
| 2017/0297517 A1 | 10/2017 | Fassnacht | |
| 2018/0093581 A1 | 4/2018 | Shiraishi et al. | |
| 2018/0229676 A1 | 8/2018 | Hudson et al. | |
| 2018/0262044 A1 | 9/2018 | Schipperges et al. | |

FOREIGN PATENT DOCUMENTS

| | | | | |
|---|---|---|---|---|
| CN | 104853949 A | 8/2015 | | |
| CN | 104943554 A | 9/2015 | | |
| CN | 105857102 A | 8/2016 | | |
| CN | 205706212 U | 11/2016 | | |
| DE | 100 53 584 A1 | 5/2002 | | |
| DE | 10 2013 218 576 A1 | 3/2014 | | |
| DE | 10 2014 214 103 A1 | 1/2016 | | |
| DE | 102017002113 A1 * | 9/2018 | | B60L 53/24 |
| FR | 2 829 632 A1 | 3/2003 | | |
| JP | 4-125033 A | 4/1992 | | |
| JP | 2007-223471 A | 9/2007 | | |
| JP | 2008-72880 A | 3/2008 | | |
| JP | 2008-179182 A | 8/2008 | | |
| JP | 2017-537828 A | 12/2017 | | |
| JP | 2018-60641 A | 4/2018 | | |
| WO | WO 2011/161758 A1 | 12/2011 | | |
| WO | WO 2014/044862 A2 | 3/2014 | | |
| WO | WO 2017/043641 A1 | 3/2017 | | |

OTHER PUBLICATIONS

Written Opinion (PCT/ISA/237) issued in PCT Application No. PCT/EP2019/073671 dated Jan. 9, 2020 (five (5) pages).

Extended European Search Report issued in European Application No. 18195131.0 dated Feb. 27, 2019 (seven (7) pages).

European Office Action issued in European Application No. 18195131.0 dated Nov. 30, 2021 (five (5) pages).

Japanese-language Office Action issued in Japanese Application No. 2021-538915 dated May 16, 2022 with English translation (14 pages).

Chinese-language Office Action issued in Chinese Application No. 201980061098.2 dated Apr. 23, 2023 with English translation (11 pages).

Communication Pursuant to Article 94(3) EPC issued in European Application No. 18195131.0 dated Jul. 17, 2023 (6 pages).

* cited by examiner

SYSTEM AND METHOD FOR PROVIDING REDUNDANT ELECTRIC POWER

BACKGROUND AND SUMMARY OF THE INVENTION

The present invention relates to a system for providing redundant electric power to at least one vehicle component and a method of using this system. The present invention relates particularly to a redundant electric power supply system.

In recent times, many system components and actuators in commercial vehicles are being replaced by electric systems. This relates in particular to electric and hybrid vehicles that need a different vehicle infrastructure, which is not anymore based on pressurized air as primary energy source. Nevertheless, also the electric systems shall provide the same safety level as the conventional systems.

Safety relevant functions in vehicles are particularly the braking and steering. To meet the safety requirements, it is typically required to have a redundant electric power management system with a high safety level—in particular for an automated driving the safety requirements are very high.

A conventional power system is disclosed in DE 10 053 584 A1, wherein a first and second voltage supply are connected via a decoupling element, and safety relevant loads are coupled over further decoupling elements to the voltage supply. Another conventional power system is disclosed in DE 10 2013 218 576, wherein a plurality of energy storage devices is arranged in parallel so that in case of a failure, one of the other voltage supplies can be engaged.

However, there is a demand for further systems that are able to provide information regarding the condition of the energy storage units continuously and in a redundant way to meet the high safety requirements in automotive applications.

At least some of these problems are overcome by a system or a method according to the independent claims. The dependent claims refer to further advantageous realizations of the subject matter of the independent claims.

Embodiments of the present invention relate to a system for providing redundant electric power to at least one vehicle component (consumer). The system comprises at least one power management unit connectable to a vehicle power network, and one or more storage units coupled to the at least one power management unit for receiving electric power to be stored in the one or more storage units. The at least one vehicle component is connectable to at least two of the storage units to enable a redundant electric power supply.

Optionally, the at least one power management unit comprises at least one of the following components: a charging unit for providing a charging power to the one or more storage units, a switching unit for (selectively) interrupting a connection to one or more of the storage units, and a logic circuit for controlling the charging unit and/or the switching unit.

Optionally, one power management unit is coupled to multiple storage units and the switching unit may be adapted to interrupt one or more of the storage units coupled to the one power management unit.

Optionally, the multiple storage units comprise each a storage element and a further logic circuit for monitoring a state of the storage element.

Optionally, each of the power management units is associated with one of the storage units with a storage element.

The logic circuit of the power management unit may be adapted to monitor a state of the storage element in the associated storage unit.

Optionally, at least some of the storage units comprise one or more terminals for connecting safety relevant vehicle components and/or other vehicle components. The terminals may enable voltage supplies for different voltages values for the vehicle component(s).

Optionally, the system comprises a (redundant) vehicle communication network. At least one of the logic circuits of the power management units may be adapted to provide status information about the storage units to the vehicle communication network.

Further embodiments relate to a vehicle, in particular to a commercial vehicle, with at least one vehicle component and a system as defined before which is suitable for providing redundant electric power to the least one vehicle component.

Further embodiments relate to a method for providing redundant electric power to at least one vehicle component. The method comprises:

managing a power supply by at least one power management unit connectable to a vehicle power network, the power being supplied by one or more storage units coupled to the at least one power management unit; and providing power to the at least one vehicle component by at least two of the storage units to enable a redundant electric power supply.

This method or part thereof may also be implemented or caused by software or a computer program product. Embodiments of the present invention can, in particular, be implemented by software or a software module in an ECU of the vehicle.

Embodiments of the present invention overcome issues of the conventional systems by providing an intelligent electric energy management solution that meets high levels of security by enabling a continuous information flow regarding the condition of the energy storage units for the vehicle via a redundant communication network. Therefore, embodiments provide a board network system which is in particular suitable for safety relevant applications (for example in braking or steering systems).

Some examples of the systems and/or methods will be described in the following by way of examples only, and with respect to the accompanying figures.

DETAILED DESCRIPTION OF THE DRAWINGS

Figure 1:
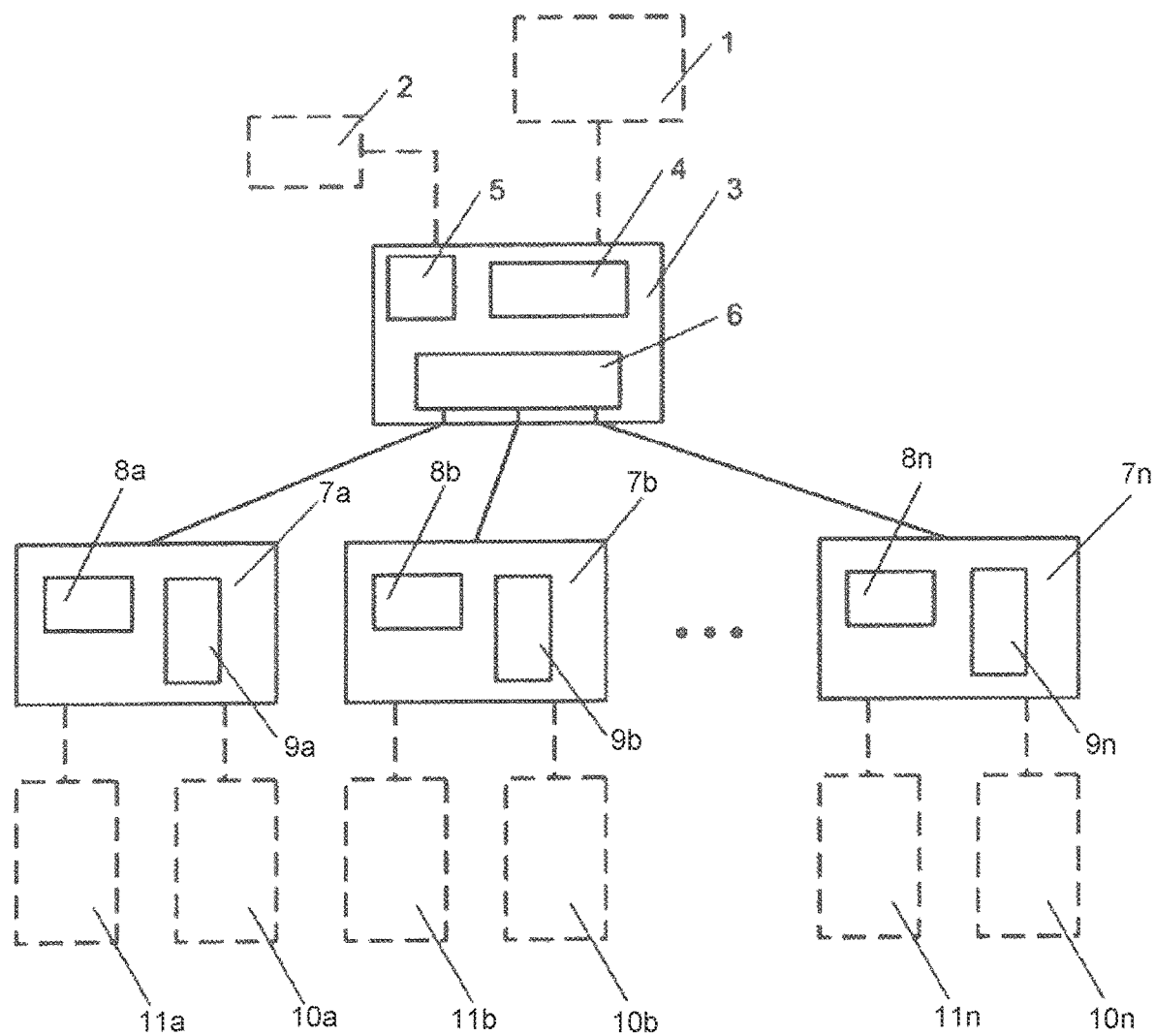
FIG. 1 depicts a system for providing redundant electric power to at least one vehicle component according to a first embodiment of the present invention.

FIG. 1 depicts a first embodiment for the system for providing redundant electric power to at least one vehicle component 10a-n, 11a-n. The system comprises one power management unit 3 connected to a vehicle power network 1 that may provide the power. In addition, status information can be provided to a vehicle communication network 2. The system comprises a plurality of storage units 7a-n that are coupled to the one power management unit 3 for receiving electric power to be stored in the storage units 7a-n. For this, the storage units 7a-n comprise at least one storage cell 9a-n.

The power management unit 3 comprises a charging unit 4 which is adapted to carry out the charging of the storage units 7a-n. The power management unit 3 further comprises a logic circuit 5 that monitors the charging as well as determines status information about the storage units 7a-n (for example the charge level of the storage cells 9a-n within the storage units 7a-n) and may provide this information to the vehicle communication network 2. The power management unit 3 finally comprises at least one switching unit 6 which is configured to interrupt the connection between the power management unit 3 to one or more of the storage cells 9a-n. The interruption is controlled by the logic circuit 5 and ensures that in case of a malfunctioning, for example within the storage units 7a-n, the respective storage unit 7a-n or at least the storage cell 9a-n can be disconnected from the system. For this, each storage unit 7a-n may include a further logic circuit 8a-n.

Each of the storage units 7a-n or a subset thereof may comprise one or more terminals to connect vehicle components 10a-n, 11a-n to the respective storage unit(s) 7a-n. The vehicle components 10a-n, 11a-n may relate to safety relevant vehicle components 10a-n and other vehicle components that consume the stored power. As a result, a safety relevant vehicle component 10a-n can be connected different storage units 7a-n so that even in case of a malfunctioning of one or some of the storage units 7a-n, the power supply to the safety relevant vehicle component 10a-n can still be maintained. Even if one storage unit 7a-n is down, the logic circuits 5, 8a-n will replace the "missing" power through the other storage units 7a-n connected to the vehicle component 10a-n. Hence, a safe power supply can be maintained up to a needed level.

Figure 2:
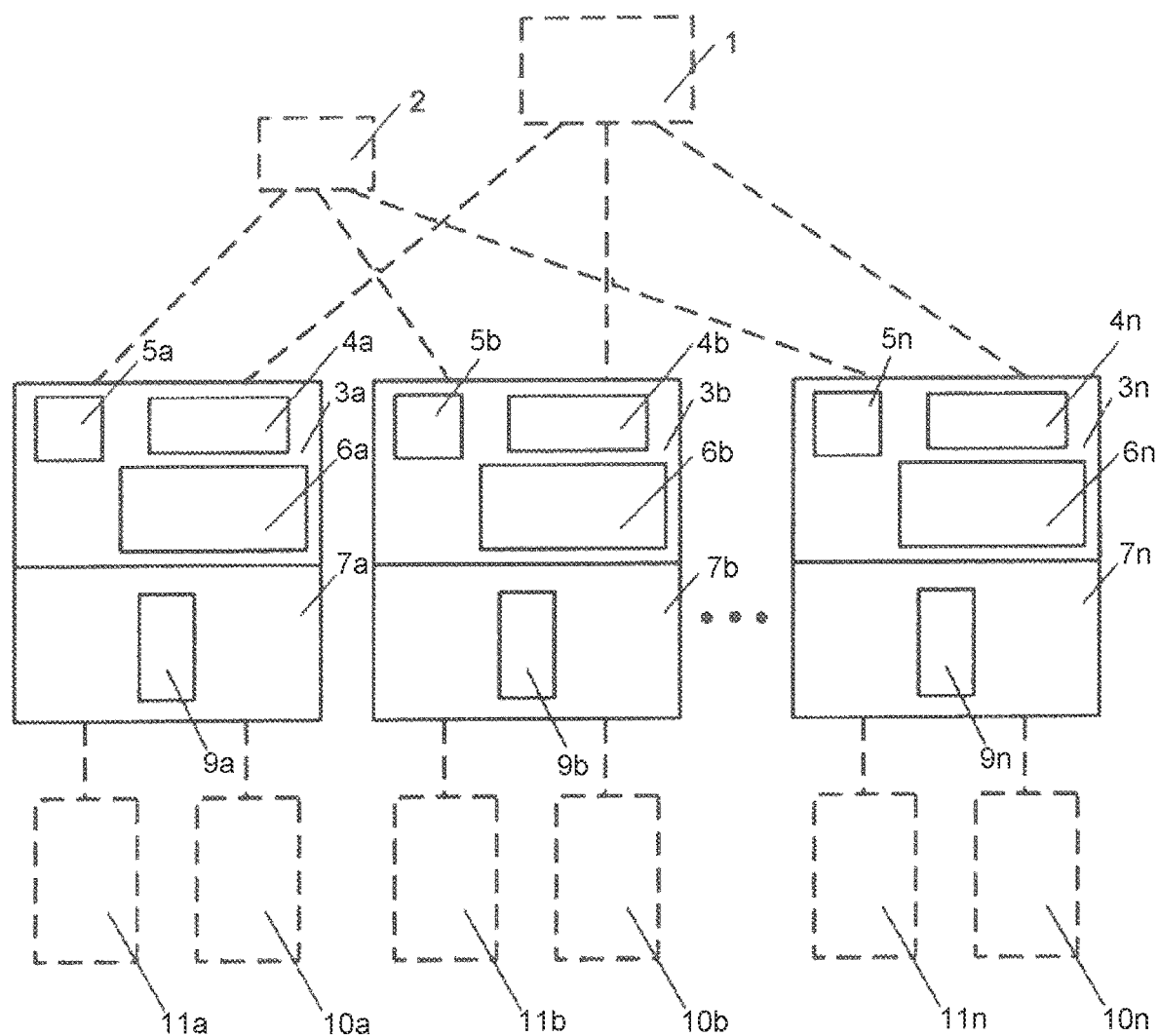
FIG. 2 depicts the system for providing redundant electric power to the vehicle components according to another embodiment.

FIG. 2 depicts another embodiment for the system for providing redundant electric power to the vehicle components 10a-n, 11a-n. When compared to the embodiment of FIG. 1, in this embodiment each of the storage units 7a-n comprises its own, dedicated power management unit 3a-n that controls and monitors the charging and the charge level of the storage cells 9a-n. The respective incorporated power management units 3a-n again comprise a switch 6a-n which is configured to disconnect the storage cell 9a-n from the system in order to provide a protection in case a malfunctioning occurs. As in FIG. 1, the power management units 3a-n each comprises a logic circuit 5a-n for controlling the charging unit 4a-n and the switch 6a-n. Each of the power management units 3a-n is connected to the vehicle power network 1 to receive power and to the communication network 2 in order to provide information about the charging state of the electric power supply.

In the embodiment of FIG. 2 there is no need that each or any of the storage units 7a-n comprise a respective logic circuit, because this function can be taken over by the logic circuit 5 being arranged in the power management unit 3 (also known as central unit). Likewise, it is possible that the function of the logic circuit 5 in the power management unit 3 can be taken over by a respective logic circuit arranged in the storage units 7a-n (not shown in FIG. 2).

Again, safety relevant vehicle components 10a-n can be connected to various storage cells 7a-n in order to ensure a redundant power supply to the safety relevant vehicle component(s) 10a-n. The redundant voltage supply through the various terminals of the storage units 7a-n may also enable a supply for different voltage values.

Both embodiments are powered by the electric board network 1 of the vehicle and can provide energy storage status information over a redundant vehicle communication network 2.

It is understood that not all of the storage cells 9a-n need to be connected to the vehicle component(s) by respective terminals. Instead a grouping of storage units 7a-n or storage cells 9a-n can be arranged. For example, a connection can be provided between different storage units 7a-n to keep the voltages at the different storage units at the same or at a desired level. Likewise, an active charge balancing unit can be formed between the different storage units 7a-n. The storage cells 9a-n can be any electrical component that is able to store electric energy and may include one or more battery cells.

The power management unit(s) 3, 3a-n in both embodiments is/are responsible for keeping a charge level of the energy storage cells 9a-n in each electric energy storage circuit at a target level to guarantee the availability for the safety relevant consumers 10a-n. Moreover, the power management unit 3, 3a-n is responsible for monitoring the energy storage and provides respective status information about the available energy and remaining functionality (for example the number or amount of remaining braking cycles or steering maneuvers that are still possible).

The intelligent electric energy storage units 7a-n are responsible for providing energy for safety relevant consumers 10a-n and other consumers 11a-n—even on different/mixed voltage levels if needed. These voltage levels are produced from electrical components that store the potential energy. The further logic circuit 8a-n monitors the circuit outputs and charge levels of the storage components 9a-n, collects the respective data and provides it to the power management unit 3. According to further embodiments, it is also possible to provide different voltage levels at the output terminals for different consumers (vehicle components) from the same circuit (the same power supply).

In the embodiment of FIG. 2, the power management unit 3a-n and the storage units 7a-n may be combined within a common block and act together as in the embodiment of FIG. 1. An advantage of the embodiment of FIG. 2 is the separation between the different storage units 7a-n together with the power management units 3a-n. Hence, it prevents better any failure propagation through the system. The logic circuit 5a-n within these blocks provides a monitoring of the energy storage, the charge management and provides status information.

Through the constant monitoring using the logic circuits 5, 5a-n, 8a-n embodiments are able to provide likewise a protection with respect to overcharging, overcurrent or a pre-charge protection. Furthermore, an energy storage charge balancing made possible by corresponding connections via charge balancing units between the output terminals.

The safety switches (for example the switch unit 6, 6a-n) provide another advantage of embodiments, because they are able to separate immediately some or a single circuit or component in case of any failure or malfunctioning. As a result, the failure will not have an adverse effect on any other component and the system according to embodiments is actually a fail-operational power supply suitable in particular for safety relevant applications. The power supply according to embodiments is thus particularly suited as backup energy that can be provided to any safety relevant consumer in case any single failure occurs in the electric energy supply system.

Further advantageous embodiments relate to the following subject matters:
  A redundant electric power management system, especially for commercial vehicles, with a central power management unit 3 which is powered by the standard board network of the vehicle and safe multiple electric energy circuits (for centralized arrangement);

The central unit 3 may be responsible for the state of energy level (battery, capacitor, super capacitor, etc.) and the state of function monitoring of the electric energy storage units 7*a-n;*

The central unit 3 may be responsible for charging and management of energy storage of the electric energy storage units 7*a-n;*

The central unit 3 contains safety switches 6 for both intelligent electric energy storages to provide possibility of separation of circuits in case any failure occurred;

The cell management and output control implemented in the intelligent electric energy storage units 7*a-n* can provide the required outputs on different voltage levels for the same circuit (mixed voltage output);

The intelligent electric energy storages 7*a-n* are separated and able to provide uninterruptable power supply for safety relevant consumers 10*a-n* using internal batteries 9*a-n;*

A redundant electric power management system, especially for commercial vehicles, including the intelligent electric energy management system 3*a-n* with individual, integrated units for each circuit 7*a-n* separately, containing charger 4*a-n,* energy storage 9*a-n* and all monitoring and control logic 5*a-n* (this arrangement explicitly provides independent circuits as a distributed arrangement);

The defined system powered by energy supply network 1 of the vehicle provides the state of energy storages and the state of function monitoring of the electric energy storage units 7*a-n* to the vehicle communication network 2;

The defined management of energy storages, wherein output control is provided to the outputs on different voltage levels for the same circuit (mixed voltage output).

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

1 vehicle power network
2 vehicle communication network
3, 3*a-n* power management unit(s)
4, 4*a-n* charging unit(s)
5, 5*a-n* logic circuit(s)
6, 6*a-n* switching unit(s)
7, 7*a-n* storage units
8*a-n* further logic circuit(s)
9*a-n* storage elements/battery cells
10*a-n*, 11*a-n* vehicle components (consumers)

The invention claimed is:

1. A system for providing redundant electric power to at least one vehicle component, comprising:
at least one power management unit connectable to a vehicle power network; and
a plurality of storages coupled to the at least one power management unit for receiving electric power to be stored in the plurality of storages and for delivering power between the plurality of storage units to enable redundant electric power supply,
wherein the at least one vehicle component is connectable to at least two of the plurality of storages to enable a redundant electric power supply through the at least one power management unit and the vehicle power network, wherein the plurality of storages each comprise at least a first set of output terminals and a second set of output terminals for connecting vehicle components, wherein the plurality of storages are configured to provide the first set of output terminals with a different voltage level than the second set of output terminals, and
wherein the at least one power management unit comprises:
a charger for providing a charging power to the plurality of storages;
a switch for interrupting a connection to one or more of the plurality of storages; and
a logic circuit for controlling the charger and the switch.

2. The system according to claim 1, wherein
one power management unit is coupled to multiple storages of the plurality of storages, and
the switch is adapted to interrupt one or more of the multiple storages coupled to the one power management unit.

3. The system according to claim 2, wherein
the multiple storages each comprise a storage element and a further logic circuit for monitoring a state of a respective storage element.

4. The system according to claim 1, wherein
each power management unit is associated with one of the plurality of storages with a storage element, and
the logic circuit is further adapted to monitor a state of the storage element in the associated storage.

5. The system according to claim 1, further comprising:
a vehicle communication network, wherein at least one of the logic circuits of the power management units is adapted to provide status information about the plurality of storages to the vehicle communication network.

6. A vehicle comprising:
at least one vehicle component; and
the system for providing redundant electric power to the at least one vehicle component according to claim 1.

7. A method for providing redundant electric power to at least one vehicle component, comprising:
managing a power supply by at least one power management unit connectable to a vehicle power network, wherein power is supplied to and stored by a plurality of storages coupled to the at least one power management unit; and
providing power to the at least one vehicle component by at least two of the plurality of storages to enable a redundant electric power supply, wherein the plurality of storages each comprise at least a first set of output terminals and a second set of output terminals for connecting vehicle components, and wherein the plurality of storages are configured to provide the first set of output terminals with a different voltage level than the second set of output terminals, where the at least one power management unit comprises:
a charger for providing a charging power to the plurality of storages,
a switch for interrupting a connection to the plurality of storages, and
a logic circuit for controlling the charger and the switch.

\* \* \* \* \*